(12) United States Patent
Browarny

(10) Patent No.: US 8,196,615 B1
(45) Date of Patent: Jun. 12, 2012

(54) LIQUID/AIR PRESSURE TESTING TOOL

(76) Inventor: Jim Browarny, Donalda (CA)

( * ) Notice: Subject to any disclaimer, the term of this patent is extended or adjusted under 35 U.S.C. 154(b) by 518 days.

(21) Appl. No.: 12/386,597

(22) Filed: Apr. 21, 2009

Related U.S. Application Data

(60) Provisional application No. 61/124,864, filed on Apr. 21, 2008.

(51) Int. Cl.
*B65B 31/00* (2006.01)
*B67C 3/00* (2006.01)

(52) U.S. Cl. ............... 141/7; 141/66; 141/38; 137/227

(58) Field of Classification Search .............. 137/227, 137/228; 141/41, 38, 7, 5, 66; 285/86
See application file for complete search history.

(56) References Cited

U.S. PATENT DOCUMENTS

| | | | | |
|---|---|---|---|---|
| 1,699,378 | A | * | 1/1929 | Smith ................. 137/226 |
| 4,766,765 | A | | 8/1988 | Ezekoye |
| 4,775,173 | A | * | 10/1988 | Sauer .................. 285/148.14 |
| 4,993,259 | A | | 2/1991 | LaFountain |
| 5,187,974 | A | | 2/1993 | Mellits et al. |
| 5,767,389 | A | | 6/1998 | LaFountain |
| 5,992,476 | A | * | 11/1999 | Sowry ................. 141/65 |
| 6,155,313 | A | * | 12/2000 | Smalley .............. 141/38 |
| RE37,151 | E | | 5/2001 | LaFountain |
| 6,935,163 | B2 | | 8/2005 | Stwart et al. |
| 7,168,771 | B2 | | 1/2007 | Nakano |
| 7,614,283 | B2 | * | 11/2009 | Allen et al. ............ 73/49.7 |
| 2001/0037829 | A1 | * | 11/2001 | Shaw et al. ........... 137/315.01 |
| 2007/0221286 | A1 | * | 9/2007 | Chantalat ............. 141/38 |
| 2010/0194099 | A1 | * | 8/2010 | Rippstein ............. 285/242 |

* cited by examiner

*Primary Examiner* — Dinh Q Nguyen
*Assistant Examiner* — Jennifer Gordon
(74) *Attorney, Agent, or Firm* — Montgomery Patent & Design, LLC; Robert C. Montgomery; Joseph T. Yaksich

(57) ABSTRACT

A device and method of using a liquid/air pressure testing tool to assist in testing and repairing liquid-filled agricultural tires is herein disclosed. The device provides a valving arrangement to allow alternating fluid transfer and air backfilling of a fluid-filled agricultural tire. The device utilizes quick-disconnect fittings providing quick in-line installation therebetween a fluid pump and a fluid filled tire. The device provides an inline ball valve and an isolation valve, thereby providing isolation of a pumping source and an air back-filling means, respectively. During fluid filling of a tire, the isolation valve allows monitoring of internal tire pressure using a common pressure gauge without removing the device or disconnecting any attached hoses. The device thus eliminates repeated steps when testing or repairing large fluid-filled tires as used on farm tractors and other agricultural machinery.

2 Claims, 2 Drawing Sheets

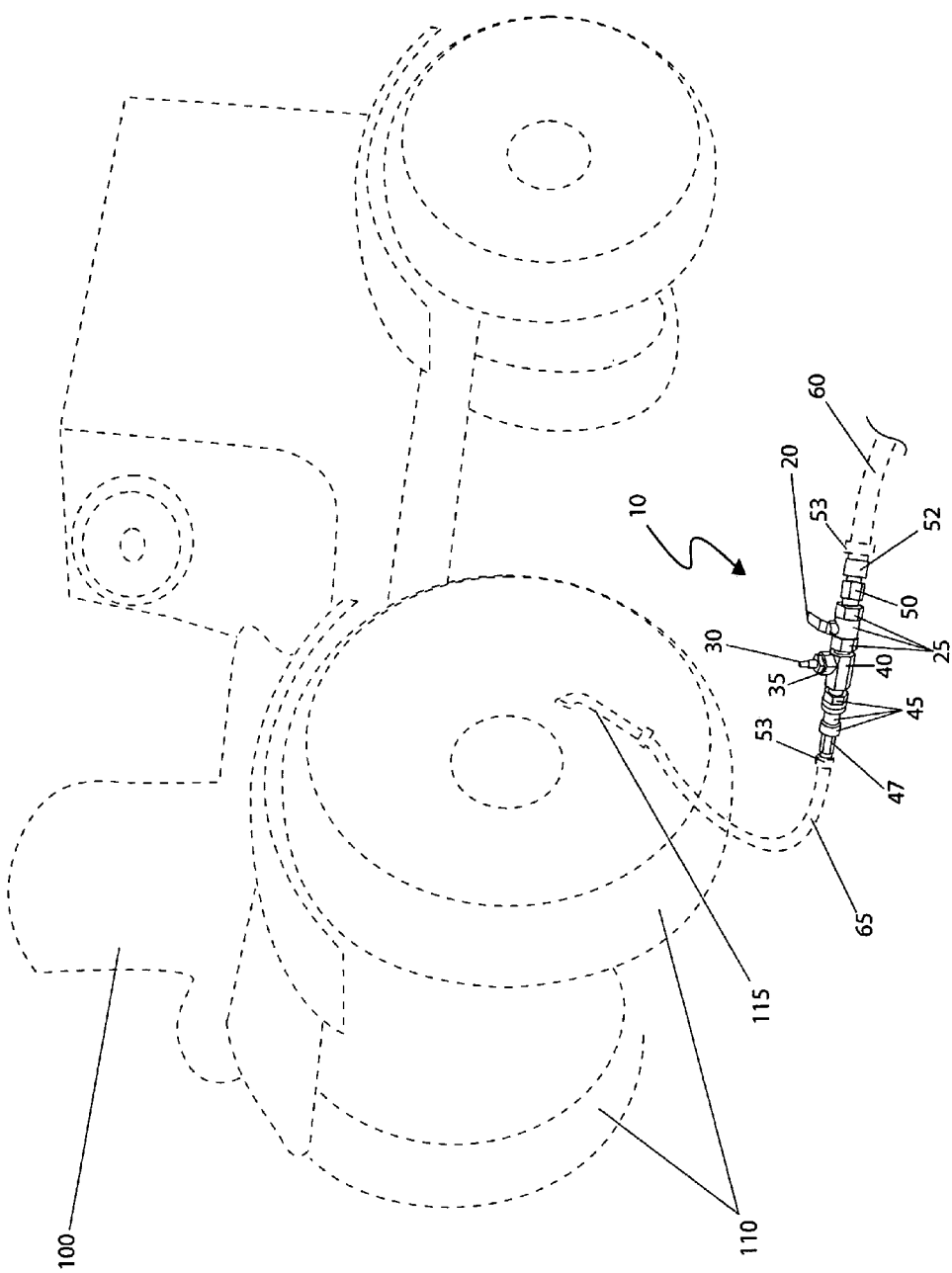

LIQUID/AIR PRESSURE TESTING TOOL

RELATED APPLICATIONS

The present invention was first described in and claims the benefit of U.S. Provisional Application No. 61/124,864, filed Apr. 21, 2008, the entire disclosures of which are incorporated herein by reference.

FIELD OF THE INVENTION

The present invention relates generally to a tire testing device and, more particularly, to a device and method of use to assist in testing and repairing water-filled tires.

BACKGROUND OF THE INVENTION

Since the invention of rubber agricultural tires heavy agricultural equipment, such as tractors, skidders, and the like, have been adding ballasts to maximize the pulling power and optimize the balance and stability of the equipment. The ballast is conventionally provided by using either iron weights or liquid-filled tires. In some cases liquid ballast is used in front tires to achieve a correct weight split for some implements of field operation and transporting. Commonly, water or a water and calcium chloride solution is used to provide economical ballast. Unfortunately, one (1) problem with filling these types of large equipment tires is that the installing, maintaining, and repairing process often requires special equipment and training. These tires are difficult to test or repair due to their large size and weight and the requirements of the water or the water and calcium chloride solution and it is of utmost importance to monitor and control the internal pressure of the tire and the amount of liquid which is used. It is commonly recommended that a tire never be filled more than ninety percent (90%), as any more could cause tire damage or present safety concerns to the operator of the equipment. In order to properly install and repair these liquid-filled tire hoses must be connected, disconnected, re-connected, and removed again for attachment of a pressure gauge; then reconnected to add more air or water. This adds time and difficulty to an otherwise a simple tire repair.

Various devices exist for testing tire pressure, valve assemblies, fluid transfer lines, or the like for maintenance and repairs. Specialized devices have attempted to provide a means of filling tires with liquid ballast. Other devices provide methods of filling and testing hydraulic assemblies such as hydraulic clutch assemblies of vehicles, prefilled hydraulic cylinders, or fluid delivery systems such as the fuel system of an automobile. These attempts tend to be overly complicated, time consuming, or difficult to manage in field operations, often times requiring removal and transportation of parts or assembly and disassembly of multi-component tools in order to properly perform the task at hand.

Such prior devices include: U.S. Pat. Nos. 5,767,389 and RE 37,151, issued in the name of LaFountain, which describes a method and apparatus for testing a fluid pressure apparatus; U.S. Pat. No. 4,766,765, issued in the name of Ezekoye, which describes a multiphase valve testing device; U.S. Pat. No. 4,993,259, issued in the name of LaFountain, which describes a method and apparatus for testing prefilled hydraulic systems; U.S. Pat. No. 5,187,974, issued in the name of Mellits et al., which describes a vehicular pressure-testing apparatus; U.S. Pat. No. 6,935,163, issued in the name of Stweart et al., which describes a method for testing parts for leaks; and U.S. Pat. No. 7,168,771, issued in the name of Nakano, which describes methods of measuring pressure of hydraulic fluid, methods of evaluating soundness and hydraulic drive devices for carrying out the methods.

While these devices fulfill their respective, particular objectives, each of these references suffers from one (1) or more of the aforementioned disadvantages. Accordingly, there exists a need for a means by which liquid filled tires can be tested or repaired in an easy manner without the difficulties as listed above. The development of the present invention herein described substantially departs from the conventional solutions and in doing so fulfills this need.

SUMMARY OF THE INVENTION

In view of the foregoing disadvantages, the inventor recognized the inherent problems associated with installing, maintaining, and repairing liquid-filled agricultural equipment tires in a field environment and observed that there is a need for a means by which liquid-filled tires can be tested or repaired and thus, the object of the present invention is to solve the aforementioned disadvantages.

To achieve the above objectives, it is an object of the present invention to provide a liquid extracting and filling tool for agricultural tires comprising a valving arrangement to allow alternating fluid transfer and air backfilling of a liquid-filled agricultural tire. The tool utilizes a plurality of quick-disconnect air fittings that provide quick in-line installation between a fluid pump hose and a fluid extraction hose attached to the tire.

Another object of the tool is to provide a device comprising a ball valve handle, a ball valve, a Schrader valve, an adapter, a "T"-fitting, a female quick-disconnect fitting, a male quick-disconnect fitting, and a plurality of nipples.

Yet still another object of the tool is to provide an inline ball valve and a Schrader valve that provide isolation of a liquid pumping source and an air back-filling source during the tire liquid extraction process.

Yet still another object of the tool is to provide a Schrader valve comprising an attachment means for a removable tire pressure gauge and providing a means of monitoring an internal pressure of the tire without requiring the removal or disconnection of any attached hoses during the tire liquid filling process.

Yet still another object of the tool is to provide a Schrader valve that provides an air injection means to the device by engaging an air supply hose against an end portion to actuate a valve portion of the Schrader valve, thereby backfilling the tire with air during the fluid extraction process.

Yet still another object of the tool is to provide the Schrader valve that provides a means to manually actuate the valve portion which bleeds excess air from the tire during a fluid filling process as needed.

Yet still another object of the tool is to provide a "T"-fitting that provides a plumbing attachment means to the standard Schrader valve via a reducing coupling adapter.

Yet still another object of the tool is to provide a plurality of quick-disconnect pipe fittings that provide timely installation and removal of the device in an in-line manner with an existing fluid transfer hose system.

Yet still another object of the tool is to provide a method of utilizing the device that enables a user to inject or bleed air from a liquid filled tire during a liquid extraction or filling process while maintaining normal fluid extraction and filling functionality.

Yet still another object of the tool is to provide a method of utilizing the device that provides for the elimination of the repetitive steps commonly associated with the testing or repairing of large liquid-filled tires.

Yet still another object of the tool is to provide a method of utilizing the device which enables for the quick testing or repair of liquid-filled tires in a manner which is quick, easy, and effective.

Further objects and advantages of the tool will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
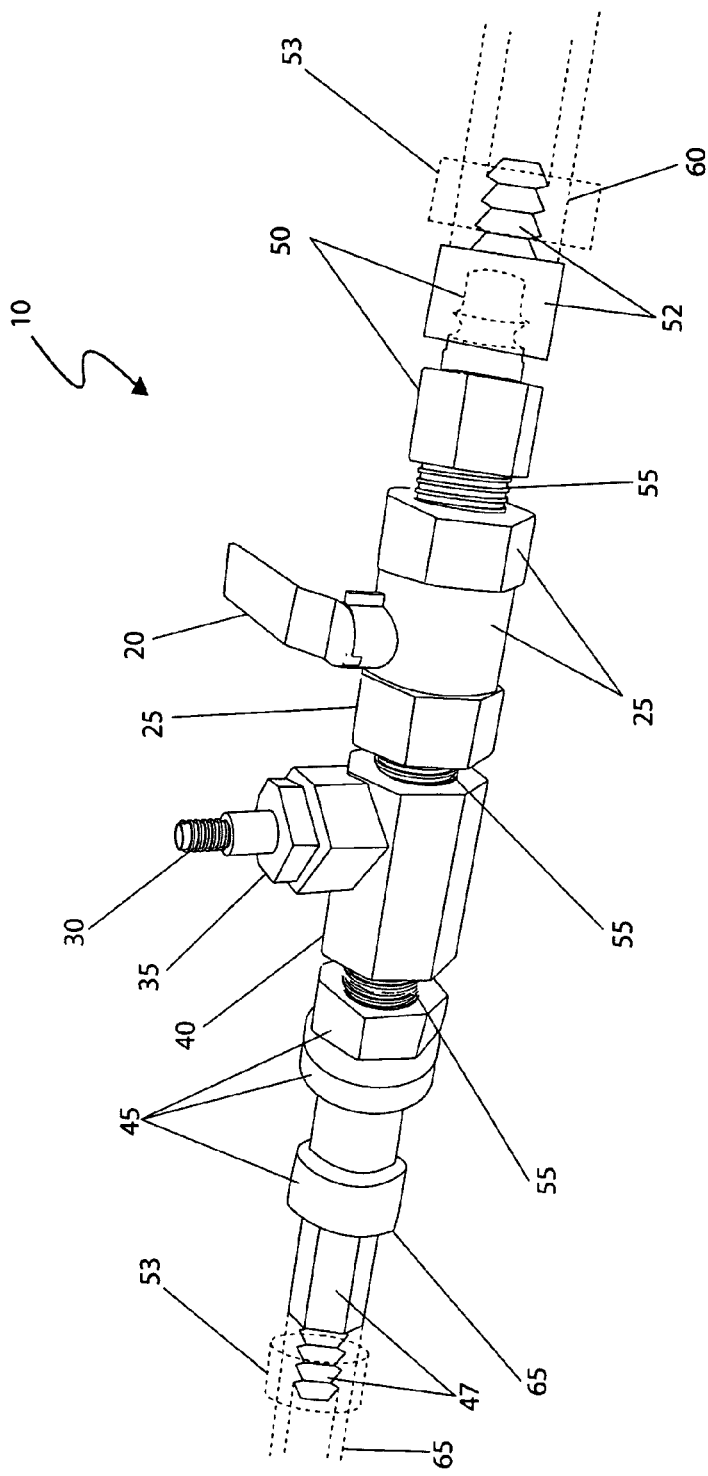
FIG. 1 is a side perspective view of a liquid/air testing tool for agricultural tires 10, according to a preferred embodiment of the present invention; and, FIG. 2 is an environmental in-use view of a liquid/air testing tool for agricultural tires 10, according to a preferred embodiment of the present invention.

| | |
|---|---|
| 10 | liquid extracting and filling tool for agricultural tires |
| 20 | ball valve handle |
| 25 | ball valve |
| 30 | Schrader valve |
| 35 | adapter |
| 40 | "T"-fitting |
| 45 | female quick-disconnect pipe fitting |
| 47 | male quick-disconnect hose fitting |
| 50 | male quick-disconnect pipe fitting |
| 52 | female quick-disconnect hose fitting |
| 53 | hose clamp |
| 55 | pipe nipple |
| 60 | pump hose |
| 65 | fluid extraction hose |
| 100 | agricultural vehicle |
| 110 | tire |
| 115 | valve stem |

DETAILED DESCRIPTION OF THE PREFERRED EMBODIMENT

The best mode for carrying out the invention is presented in terms of its preferred embodiment, herein depicted within the FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a liquid extracting and filling tool for agricultural tires (herein described as the "device") 10 and a method of use thereof, comprising a valving arrangement to allow alternating fluid transfer and air backfilling of a fluid-filled agricultural tire 110. The device 10 utilizes quick-disconnect air fittings providing quick in-line installation therebetween a fluid pump hose 60 and a fluid extraction hose 65 attached thereto a tire 110. During a tire fluid extraction process, the device 10 provides an inline ball valve 25 and a Schrader valve 30, thereby providing isolation of a pumping source and an air back-filling means, respectively. During fluid filling of a tire 110, the Schrader valve 30 allows monitoring of internal tire pressure using a common pressure gauge without removing the device 10 or disconnecting any attached hoses 60, 65. The device 10 thus eliminates repeated steps when testing or repairing large fluid-filled tires 110 as used on farm tractors and other agricultural machinery 100.

Referring now to FIG. 1, a side perspective view of the device 10, according to the preferred embodiment of the present invention, is disclosed. The device 10 comprises a ball valve handle 20, a ball valve 25, a Schrader valve 30, an adapter 35, a "T"-fitting 40, a female quick-disconnect pipe fitting 45, a male quick-disconnect hose fitting 47, a male quick-disconnect pipe fitting 50, a female quick-disconnect hose fitting 52, and a plurality of pipe nipples 55. The device 10 provides a particular assembly of common plumbing components made using corrosion materials such as brass and/or stainless steel. The device 10 enables a user to inject or bleed air therefrom a fluid filled tire 110 during a fluid extraction or filling process while maintaining normal fluid extraction and filling functionality. The quick-disconnect pipe fittings 45, 47, 50, 52 provide timely installation and removal of the device 10 in an in-line manner therewith an existing fluid transfer hose system and are envisioned to be common type-A or type-M air fittings made using brass or stainless steel materials being common in the industry. The existing fluid transfer hose system comprises a pump hose 60 and a fluid extraction hose 65 as well as additional fluid components (see FIG. 2). The ball valve 25 and "T"-fitting 40 are assembled in series therebetween the quick-disconnect pipe fittings 45, 50 using a plurality of interconnecting pipe nipples 55 forming a sealed linear assembly in a conventional manner. Said quick-disconnect pipe fittings 45, 50 provide a connection means thereto the existing fluid transfer hose system via the respective male 47 and female 52 quick-disconnect hose fittings. The male 47 and female 52 quick-disconnect hose fittings comprise common barbed hose fittings providing secure sealed insertion therewithin respective fluid extraction 65 and pump hoses 60 using common threaded or crimped pipe clamps 53. The ball valve 25 is located adjacent thereto the male quick-disconnect pipe fitting 50, thereby providing an isolating means therebetween the pump hose portion 60 and the fluid extraction hose portion 65. The ball valve 25 comprises a TEFLON®—or brass-seated corrosion-resistant valve having an inner bore of one-half (½) to one (1) inch. The ball valve 25 further comprises a common "L"-shaped handle 20 with a rubberized gripping surface providing a 90-degree open/closing sweep. The "T"-fitting 40 provides a plumbing attachment thereto a standard Schrader valve 30 via a reducing coupling adapter 35. The Schrader valve 30 provides an air injection means thereto the device 10 by pressing a common air hose thereagainst an end portion to actuate a valve portion of the Schrader valve 30 in a conventional manner, thereby backfilling the tire 110 with air during the fluid extraction process. Said Schrader valve 30 may also be manually actuated to bleed excess air therefrom the tire 110 during a fluid filling process as needed. The adapter 35 comprises a standard brass or stainless steel fitting providing a threadingly adaptable function between the Schrader valve 30 and the "T"-fitting 40 and is envisioned being made using conventional machining processes.

Referring now to FIG. 2, an environmental in-use view of the device 10, according to a preferred embodiment of the present invention, is disclosed. The device 10 is illustrated here providing a fluid extraction or filling process thereto an agricultural vehicle tire 110. The device 10 is configured in an in-line arrangement being positioned therebetween the fluid pump hose 60 and the fluid extraction hose 65 via engagement of the female 45 and male 50 quick-disconnect pipe fittings therewith respective male 47 and female 52 quick-disconnect hose fittings. The fluid extraction hose 65 provides a connection means therebetween the device 10 and a valve stem portion 115 of the tire 110. The fluid pump hose 60 provides connection of the device 10 thereto an existing fluid pumping system which provides a pressurized supply of fluid to fill or a suction source to extract fluids therefrom the tire 110. The existing fluid transfer system is envisioned to comprise fluid transfer components such as, but not limited to: a fluid pressure pump, a suction pump, and the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 2.

The method of installing the device 10 may be accomplished by performing the following steps: inserting barbed portions of the male 47 and female 52 quick-disconnect hose fittings thereinto respective extraction 65 and pump hoses 60; securing said male 47 and female 52 quick-disconnect hose fittings thereto using common threaded or crimped pipe clamps 53; and, installing the center valving portion of the device 10 in an in-line manner by engaging the female 45 and male 50 quick-disconnect pipe fittings thereinto said male 47 and female 52 quick-disconnect hose fittings.

The method of utilizing the device 10 to perform a fluid extraction process may be achieved by performing the following steps: rotating the tire 110 so as to orientate a valve stem portion 115 thereto a 6-oclock position; opening the ball valve 25 using the ball valve handle 20; activating a remote suction pump, thereby extracting fluid therefrom a tire 110 interior until said tire 110 begins to cavitate; turning off the suction pump; closing the ball valve 25; injecting compressed air thereinto the Schrader valve 30 using a common air hose until restoring a desired tire shape and/or measured pressure; repeating the previous fluid extraction and air injection steps until a maximum amount of fluid has been extracted therefrom the tire 110.

The method of utilizing the device 10 during a fluid filling process may be achieved by performing the following steps: rotating the tire 110 until the valve stem 115 is at a 12-oclock orientation; opening the ball valve 25 using the ball valve handle 20; activating a remote fluid pressure pump, thereby injecting fluid thereinto the tire 110; monitoring internal tire pressure while adding liquid by applying a common air gauge thereto the integral Schrader valve 30; obtaining a particular pressure therewithin said tire 110; deactivating the fluid pressure pump upon obtaining a maximum allowable internal pressure; bleeding off excess air by closing the ball valve 25 and using the Schrader valve 30 to release air trapped therein the tire 110; repeating the fluid filling and air bleeding steps described above until obtaining a required volume of fluid therein the tire 110; and, providing a final internal pressure thereto the fluid filled tire 110 using the Schrader valve 30 and a common compressed air hose.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A method of selectably extracting or filling a tire with a tool comprised the steps of:
    providing said tool, comprising:
        a first connection means;
        a corrosion-resistant ball valve with a handle, comprising a threaded connection and in fluid communication with said first connection means;
        a "T"-fitting comprising a first end having a threaded connection and in fluid communication with said ball valve, a central end, and a second end;
        a Schrader valve threadably connected to said central end of said "T"-fitting; and,
        a second connection means having a threaded connection and in fluid communication with said second end of said "T"-fitting;
    connecting said first connection means to a fluid pump hose and securing with a pipe clamp;
    connecting said second connection means to a fluid extraction hose and securing with a pipe clamp;
    connecting said ball valve to said first connection means with said threaded connection;
    connecting said first end of said "T"-fitting to said ball valve with said threaded connection;
    connecting said Schrader valve to said central end of said "T"-fitting;
    connecting said second end of said "T"-fitting with said threaded connection to said second connection means; and,
    selectively commencing an extraction means from or a filling means to said tire;
    wherein said commencing an extraction means step further comprises:
        orienting a valve stem portion of said tire to an accessible position;
        opening said ball valve using said handle;
        activating a suction pump in fluid communication with said fluid extraction hose, thereby extracting fluid from said tire and through said tool until said tire begins to cavitate;
        turning off said suction pump;
        closing said ball valve;
        injecting compressed air into said Schrader valve with an air hose, wherein said compressed air enters said tire through said tool until restoring a desired tire shape or a desired pressure; and,
        continuing to extract fluid from said tire and injecting said compressed air into said tire until a desired amount of fluid has been extracted from said tire.

2. The method of claim 1, wherein said step of commencing a filling means further comprises the steps of:

orienting a valve stem portion of said tire to an accessible position;

opening said ball valve using said handle;

activating a fluid pressure pump, thereby injecting fluid through said tool and into said tire;

monitoring an internal tire pressure by applying an air gauge to said Schrader valve;

deactivating said fluid pressure pump upon obtaining a desired internal tire pressure;

bleeding off excess air by closing said ball valve and activating said Schrader valve to release said excess air;

continuing to fill fluid into said tire and bleeding said excess air from said tire until obtaining a desired volume of fluid in said tire; and, injecting compressed air into said Schrader valve with an air hose, wherein said compressed air enters said tire through said tool until obtaining a final internal tire pressure.

\* \* \* \* \*